CIRCUIT-ARRANGEMENT FOR QUIET-TUNING RADIO-RECEIVERS
Filed Sept. 10, 1952
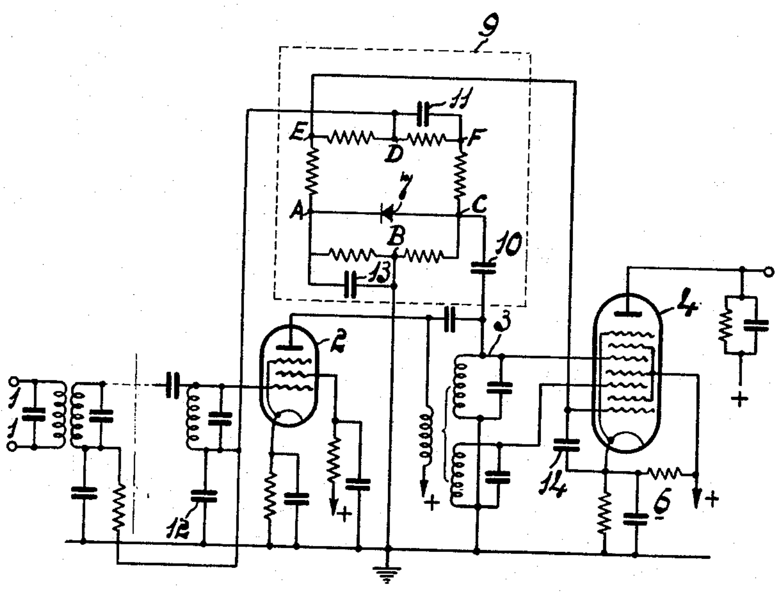
INVENTOR
ANTONIUS BOEKHORST
BY Fred M Vogel
AGENT United States Patent Office 2,714,159

Patented July 26, 1955

2,714,159

CIRCUIT-ARRANGEMENT FOR QUIET-TUNING RADIO-RECEIVERS

Antonius Boekhorst, Eindhoven, Netherlands, assignor to Hartford National Bank and Trust Company, Hartford, Conn., as trustee Application September 10, 1952, Serial No. 308,849

Claims priority, application Netherlands September 17, 1951

2 Claims. (Cl. 250—20)

This invention relates to circuit-arrangements for the quiet-tuning of radio-receivers and more particularly frequency modulation receivers wherein the signal produced in an intermediate frequency stage supplies, via a rectifier, a releasing voltage for unblocking a blocked tube connected behind said rectifier in the receiving circuit.

The invention has for its principal object the provision of a simple circuit-arrangement with so-called delayed automatic gain control. The invention is characterized by an impedance network which is coupled to the rectifier and is in direct-voltage equilibrium at a low signal strength, and from which both the releasing voltage and the automatic gain control voltage are taken, the direct voltage equilibrium being upset if the releasing voltage exceeds a predetermined value.

In order that the invention may be readily carried into effect, it will now be described in greater detail with reference to the accompanying drawing illustrating schematically a preferred embodiment of the invention. The incoming oscillations are supplied by way of input terminals 1 of a radio receiver through conventional radio frequency and mixing stages (not shown), to an intermediate frequency tube 2, thus producing an intermediate frequency signal across the output circuit 3 of this tube. The intermediate frequency signal is supplied to a succeeding tube 4 which, when using the circuit-arrangement for receiving frequency-modulated oscillations may be a frequency detector of any conventional design.

This tube 4 is so biased by means of a high cathode bias provided by a voltage divider 6, as to block the tube in the absence of an intermediate frequency signal. By means of a rectfier 7 rectifying the intermediate frequency signal across the circuit 3, a releasing voltage is set up at a point E within an impedance network contained within broken-line box 9 and applied to a control grid of tube 4 in order to unblock this tube on the occurrence of a sufficient input signal.

To this end, in accordance with the invention, the rectifier 7 is coupled to said impedance network 9, from which network are taken the releasing voltage at point E and, moreover, an automatic gain control voltage. At a low signal strength across circuit 3 said impedance network is in direct voltage equilibrium (that is to say that the voltage difference between points B and D therein is independent of a voltage supplied to points A and C), the equilibrium being, however, upset as soon as the releasing voltage at point E exceeds a predetermined value. In this manner the voltage difference between points B and D will change only when the releasing voltage exceeds the said predetermined value, hence this potential difference may be utilized as a so-called delayed automatic gain control voltage.

The impedance network 9 is more particularly a bridge ABCD, whose point B is connected to a point of constant potential, for example, ground, the releasing voltage being taken from point E, whose potential gradually becomes more positive with respect to that of point B with an increase in signal strength, and the automatic gain control voltage being taken from point D which also has a substantially constant potential at low signal strength. The automatic gain control voltage is applied to the input circuit of tube 2 and also to the input circuit of the preceding stage.

For this purpose the impedances of bridge ABCD are proportioned in such a manner that at a low signal strength the voltages produced by the rectifier 7 between points AB, AD and between points BC, DC, respectively, are equal. If, however, at a high signal strength the releasing voltage at point E exceeds a predetermined value, particularly the value at which control grid current tends to flow in tube 4, the voltage at E will practically no longer increase so that the direct current equilibrium of bridge ABCD is broken and the automatic gain control voltage at D, which until then has been substantially constant, tends to drop.

It will be evident that this break of direct current equilibrium may, for example, also be effected by connecting a point of bridge ABCD through a second thresholded rectifier (not shown) to a point of, for example, constant potential. As an alternative, the automatic gain control voltage may be taken from a point between D, E and D, F, respectively. In this event it increases slowly and drops slowly respectively with an increase in signal strength, it dropping considerably when the releasing voltage exceeds the predetermined value.

The impedance network 9 further enables in a simple manner suppression of undesired amplitude modulations in frequency modulation reception. To this end the coupling capacitor 10 between bridge ABCD and circuit 3 has a value such that it poorly passes intermediate frequency oscillations, and does not pass low-frequency oscillations, thus producing at points C and F respectively a low frequency voltage which corresponds to the undesired amplitude modulation. This low-frequency voltage is applied, through a capacitor 11 to the grid of at least one tube, for example, tube 2, connected before the rectifier 7 in the receiving circuit, where it brings about counter modulation of said undesired amplitude modulation.

For example, the resistor between points A and B has a value of 100 kohm, that between B and C a value of 56 kohm, that between C and F a value of 82 kohm, that between F and D a value of 390 kohm, that between D and E a value of 820 kohm and that between E and A a value of 22 kohm, the capacitor 10 being 12 mmfd., capacitor 11 being 10,000 mmfd., capacitor 12 being 300 mmfd., capacitor 13 being 33,000 mmfd. and capacitor 14 being 180,000 mmfd. The resistor between points C and F may advantageously be replaced by an intermediate-frequency choke.

What I claim is:

1. In a radio receiver including an intermediate-frequency stage having input and output circuits and a succeeding stage coupled to said output circuit, a silent tuning device for said receiver comprising means to block said succeeding stage for applied intermediate-frequency signals falling below a predetermined amplitude level, a four-terminal impedance bridge network, a rectifier coupling said output circuit to said network to apply a voltage thereto depending on the amplitude of said intermediate-frequency signals, means for coupling a first terminal of said four terminals to a point of constant potential, means connecting a point in said network to said succeeding stage to apply thereto a releasing voltage having a gradually increasing positive potential with respect to that of said first terminal with an increase in the amplitude of said intermediate-frequency signals, whereby said network develops at said point a voltage unblocking said succeeding stage, and means for deriving an automatic gain control voltage from a second of said four terminals having a substantially constant direct potential at a low amplitude of said intermediate-frequency signals and a gradually increasing negative direct potential with an increase in the amplitude of said intermediate-frequency from the moment said releasing voltage exceeds a predetermined value.

2. A device, as set forth in claim 1, wherein said succeeding stage comprises a frequency detector having an electron discharge device having a control grid to which said releasing voltage is applied, and wherein at said predetermined value the releasing voltage causes control grid current to flow in said device from which instant onwards an additional direct current flows through said impedance bridge network to the effect that the automatic gain control voltage has a considerable negative value.

References Cited in the file of this patent

UNITED STATES PATENTS

| | | |
|---|---|---|
| 2,023,458 | Yolles | Dec. 10, 1935 |
| 2,129,029 | Roberts | Sept. 2, 1938 |
| 2,188,658 | Hershey | Jan. 30, 1940 |
| 2,543,523 | Couillard | Feb. 27, 1951 |